UNITED STATES PATENT OFFICE.

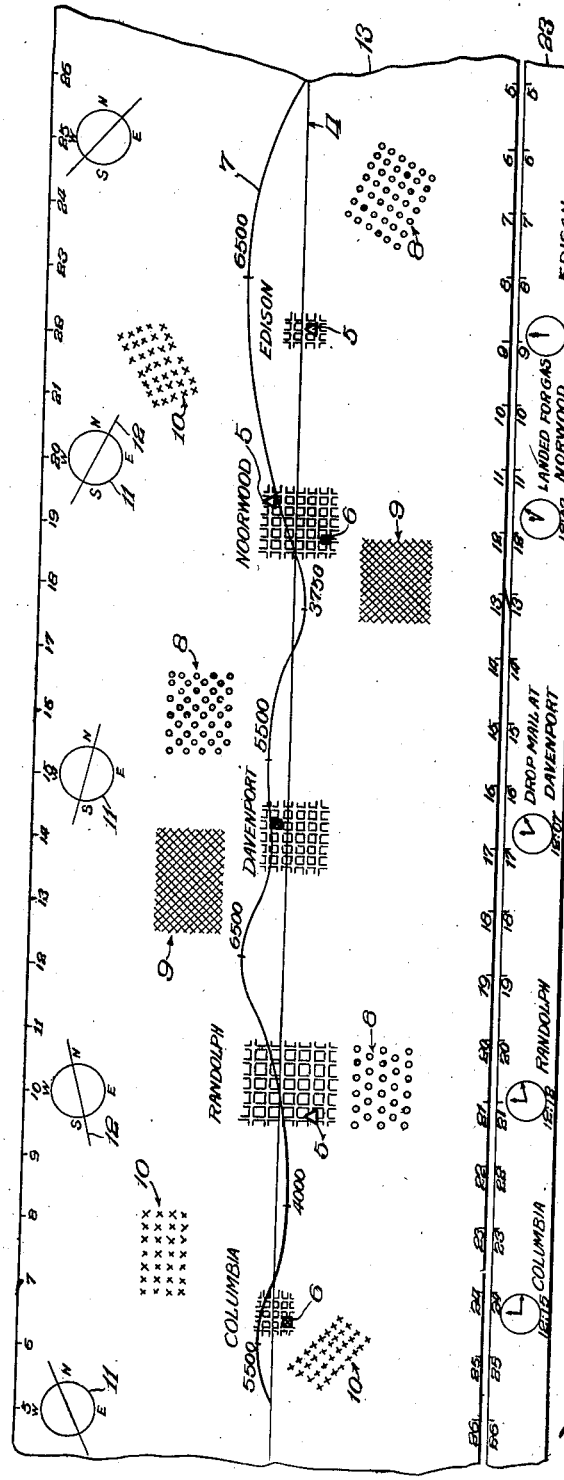

DAVID L. BEHNCKE, OF CHICAGO, ILLINOIS.

AERIAL-PHOTOGRAPH MAP.

1,388,915.   Specification of Letters Patent.   Patented Aug. 30, 1921.

Application filed April 19, 1919. Serial No. 291,262.

*To all whom it may concern:*

Be it known that I, DAVID L. BEHNCKE, a citizen of the United States, residing at Chicago, in the county of Cook and State of Illinois, have invented certain new and useful Improvements in Aerial-Photograph Maps, of which the following is a specification.

The object of this invention is, primarily, to provide an aerial photograph map of a strip of country constituting an aerial route from place to place with such information as will be useful and instructive and of interest to the pilot of an airship traveling the route.

It has been customary in the past to prepare road maps for use of automobilists and others to indicate the routes of travel from place to place with such other information as will be useful in connection with such travel, but these maps cannot be used by air pilots, except to ascertain distances and directions, because travel in the air differs so greatly from travel on the ground. For example, an air pilot must know in traveling cross country where the good landing fields are located so that he may know where a safe landing can be made and avail himself thereof to replenish his supplies, to make repairs or for other purposes, and he should be advised about the desirable altitude of travel, as to localities where peculiar air currents prevail, and as to many other things which are desirable for safe travel in the air and which must be supplied to a pilot before making the trip.

My invention is also useful for indicating the right-of-way of a railroad, the course of a stream, a boundary line and other like information where a photographic picture of a strip of country will disclose desirable information.

I contemplate providing the map in the form of a continuous strip mounted on a supply reel and adapted to be wound therefrom onto a takeup reel in the course of the travel, and in the accompanying drawings illustrating one embodiment of the invention, Figure 1 illustrates a section of the map;

Fig. 2 is a longitudinal sectional view showing the map inclosed in a suitable cabinet; and Fig. 3 shows a key to the markings on the map.

Referring to the drawings, the map is made by taking aerial photographs of definite sections of a route and combining them in the form of a photographic strip to provide a continuous photograph of the route. The map may show a strip of country fifteen miles, more or less, wide which will afford ample opportunity for the pilot to maneuver his ship and make landings under all ordinary conditions. The map section shown in Fig. 1 will indicate with sufficient clearness the general features of the invention although it does not represent everything that a photograph would show, such as fields, fences, trees, roads and other things which a pilot should know. The line of flight is indicated by the straight line 4 extending lengthwise of the map and preferably located midway between its side edges. This line indicates the course in which the pilot should fly with reference to the cities and towns along the route. The names of the cities and towns preferably appear on the map in association therewith and suitable markings are preferably used to convey information useful to the pilot. For example, the triangular mark 5 may indicate where good repairs and supplies may be obtained and the square mark 6 may indicate where poor repairs and supplies may be obtained. Additional marks may be employed as will be found desirable in preparing a map of this description. The altitude line 7 indicates the height at which the pilot should travel and it is preferably marked at intervals with figures indicating the altitude in feet so that the pilot will know the different altitudes at which the best flying is obtainable at stated intervals along the route. It is very important for the pilot to know where the good landing fields are located and it is also important for him to know, in case of an emergency, where landings may be made even at some risk. For this purpose I deem it desirable to indicate on the map the good, bad and poor landing fields and in the drawings I have employed the markings 8, 9 and 10 for this purpose. Any suitable markings may be used on the map to indicate any information that may be desirable. It will be understood, of course, that at ordinary flying altitude the pilot can readily distinguish cattle and people and such things as buildings, roads, trees, fields, fences, etc., but there are many things of great importance in aerial travel which the pilot cannot readily determine at flying altitude and as to which he should be advised for safe travel. For example, a field may appear to the pilot to present a safe landing place but in reality it may have a very dangerous slope or it may be rough or rolling, soft or marshy, which would make landing unsafe.

At one side of the map I provide a plurality of compass dial representations 11 spaced apart at suitable intervals and each provided with a direction line 12 indicating the direction which the pilot should be traveling at that point with reference to magnetic north on his compass. By steering his ship in accordance with the direction lines 12 the pilot will have no difficulty in holding to the line of flight.

On one side edge of the map I mark the mileage in one direction and on the other side edge the mileage in the other direction so that the pilot will be constantly advised of the distance he has traveled and of the distance he has yet to travel when going in either direction.

The map is made in a continuous strip 13, is mounted on reels 14 suitably supported in the cabinet 15 and passes from one reel to the other over guide rolls 16 and between glass plates 17 and 18. The glass plate 17 is preferably removable from the cabinet so that a magnifying glass may be substituted therefor if desired. One of the reels 14 is a supply reel and the other a take-up reel and they may be operated by cranks 19 and provided with ratchets and other parts common to such devices. The key to the markings on the map may be displayed on portions 20 of the cabinet top at the ends of the glass plate 17, or elsewhere and an electric light 22 may be located within the cabinet and supplied with current from a storage battery to furnish light so that the map can be used at night.

I also prefer to provide an additional strip 23 on the reels 14 and at one side edge of the map strip 13 with mileage marks on one edge corresponding to those on the edge of the map strip indicating the mileage in the direction in which the pilot proposes to travel. This strip may be marked by the pilot or by others with any information which the pilot may desire for a particular trip. If it is desired that the pilot shall drop mail at a certain place this strip may be marked at a point opposite that place, as indicated by the mileage. This strip may bear time marks indicating when a pilot should arrive at various places, and the pilot may be provided with a time stamp to stamp this strip at said places so that his time may be checked accordingly. The pilot may utilize this strip for recording incidents of his trip and in order that access may be had to the strip for this and other purposes the glass plate 17 will be made to cover only the map strip 15, leaving the additional or information strip 23 clear.

My invention is intended to be employed in preparing route maps for aerial travel from place to place throughout the country so that air pilots may supply themselves with maps in the principal cities or elsewhere to guide them in cross country travel over routes with which they are not familiar. The information provided by the map is intended to be such as will be useful to a pilot in such travels and particularly such as it is important he should have before him in case of an emergency. The map will also be useful even to those pilots who are more or less familiar with a route since it gives with certainty information which the pilot might desire at any time. The section of map disclosed through the plate between the reels may cover a distance of greater or less length according to the way in which the map is made but in any event the pilot will always have ample opportunity for turning the take-up reel so that he may keep himself fully advised of the conditions of the route over which he is traveling.

While the invention is particularly useful for guiding air pilots in their travels it can also be used for many other purposes and I would therefore have it understood that I do not intend to limit the invention to any particular use or to the particular lay-out and arrangement herein shown and described.

I claim:

1. An aerial route map comprising a scroll having thereon photographic reproductions of portions of the earth's surface along a predetermined route, a flight line extending longitudinally of the scroll and along the photographic reproductions thereon, and an altitude line in coöperative relation with the flight line.

2. An aerial route map comprising a scroll having thereon photographic reproductions of portions of the earth's surface along a predetermined route, a flight line extending longitudinally of the scroll and along the photographic reproductions thereon, a sinuous altitude line in coöperative relation with the flight line, and flight altitude markings at intervals adjacent the altitude line.

3. An aerial route map comprising a scroll having thereon photographic reproductions of portions of the earth's surface along a predetermined route, a flight line extending longitudinally of the scroll and along the photographic reproductions thereon, altitude markings in coöperative relation with the flight line, and landing markings on the map and in geographic relation to the flight line.

4. An aerial route map comprising a scroll having thereon photographic reproductions of portions of the earth's surface along a predetermined route, a flight line extending longitudinally of the scroll and along the photographic reproductions thereon, altitude markings in coöperative relation with the flight line, and a record strip parallel with and independent of the map, the map and strip having registered markings.

5. An aerial route map comprising a scroll having thereon photographic reproductions of portions of the earth's surface along a predetermined route, a flight line extending longitudinally of the scroll and along the photographic reproductions thereon, altitude markings in coöperative relation with the flight line, and a record strip parallel with and independent of the map, the map and strip having registered distance scales.

DAVID L. BEHNCKE.

Witnesses:
WM. O. BELT,
M. A. KIDDIE.